Sept. 8, 1925.  
J. A. COLE  
1,552,468  
ANTISKID CHAIN FOR AUTOMOBILES  
Filed July 18, 1924
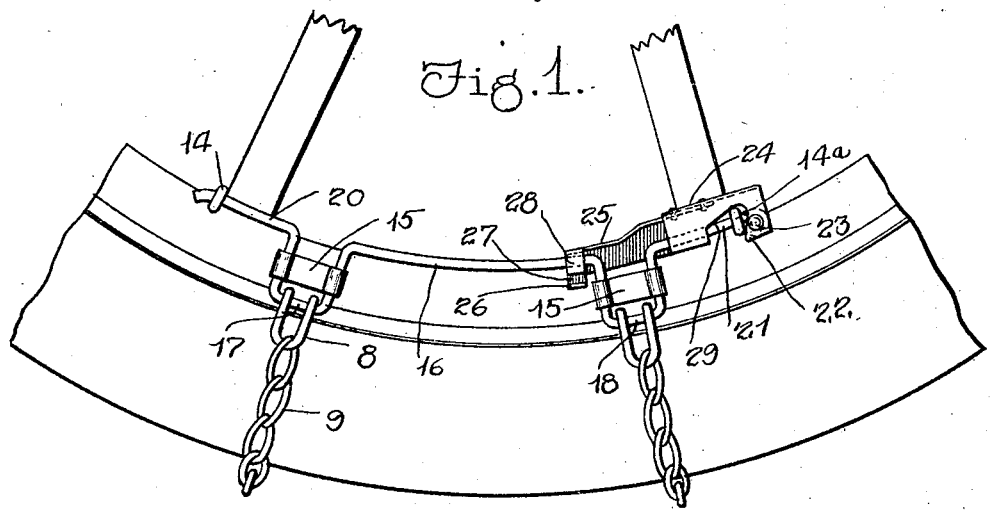
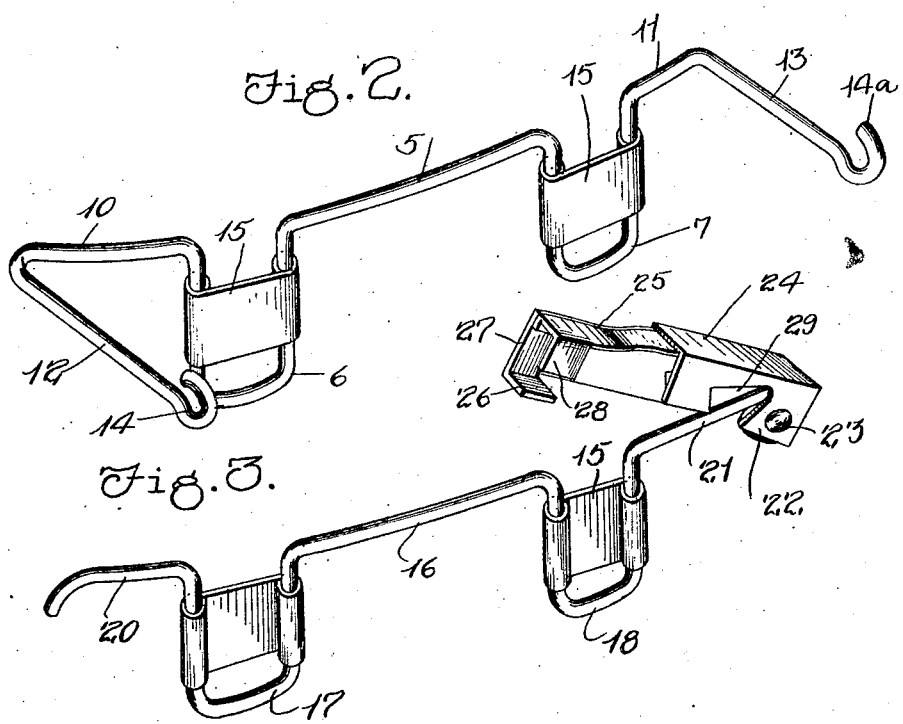
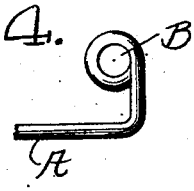
Inventor,  
Julius A. Cole  
By *(signature)*  
Attorney Patented Sept. 8, 1925.

1,552,468

UNITED STATES PATENT OFFICE.

JULIUS A. COLE, OF CAMDEN, TENNESSEE.

ANTISKID CHAIN FOR AUTOMOBILES.

Application filed July 18, 1924. Serial No. 726,757.

*To all whom it may concern:*

Be it known that I, JULIUS A. COLE, a citizen of the United States of America, and resident of Camden, in the county of Benton and State of Tennessee, have invented certain new and useful Improvements in Antiskid Chains for Automobiles, of which the following is a specification.

This invention relates to anti-skidding or so-called mud chains for automobile wheels, and it has for an object the provision of novel chain attaching devices, associated with cross or mud chains which can be expeditiously applied to or removed from automobile wheels.

It is a further object of this invention to produce chains of the character indicated having attaching means that can be applied to segments or portions of a wheel, and even though the wheel is deeply imbedded in mud, the anti-skidding devices can be applied to those parts of the wheel that are exposed and thereafter sections of chains can be applied to that portion of the wheel which was formerly imbedded and afterwards exposed, so that by the employment of a plurality of sections having chains associated with them, the said chains may be installed on a wheel even after it has lost its traction.

It is a further object of this invention to produce anti-skid chains and attachments therefor which will be prevented from unduly creeping circumferentially of the wheel or laterally thereof; and it is furthermore an object of the invention to produce fastenings which are strong and durable and expeditiously manipulated, as stated.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a wheel, showing a device embodying the invention applied thereto;

Figure 2 illustrates a perspective view of the fastening on one side of the wheel;

Figure 3 illustrates a perspective view of the chain connection on the other side of the wheel, the chains being omitted; and Figure 4 illustrates a view in elevation showing a modified construction for the pivot receiving end of one of the bars.

In carrying the invention into practice in the present embodiment of the invention, it is to be understood that a plurality of anti-skidding or mud chain sections shall constitute an equipment for a wheel, and for the purpose of this disclosure, one of such sections is disclosed.

A side bar 5 is shaped to present offset loops 6 and 7, into which the hooks or terminal members 8 of chains 9 are anchored as is ordinarily done in securing cross chains to the devices which anchor them on a wheel. The bar 5 has portions 10 and 11 which extend beyond the loops 6 and 7, respectively, and the ends of the bar extend at right angles to the general length of the bar to form cross arms 12 and 13 which terminate in an eye 14 and a hook 14ª, respectively, for a purpose to be presently explained.

The looped portions of the loops 6 and 7 of the bar are provided with guards 15 comprising strips of metal having their ends shaped to encircle or embrace the material of which the loops are formed, a condition which prevents the loops from spreading, or the material of which the loops are formed from being distorted.

The anchoring device for the chain at the opposite side of the felly or rim and preferably for the outside anchoring member comprises a bar 16 having loops 17 and 18 that correspond with the loops 6 and 7 for the purpose of engaging the opposite ends of the cross chains. Guards 15 similar to those illustrated on loops 6 and 7 and functioning as described, are provided for the loops 17 and 18. An extension 20 of the bar beyond the loop 17 has a slightly curved extremity which is intended to be inserted in the eye 14 of the arm 12, whereas the extension 21 of the bar 16 is embraced by the hook 14ª on the end of the arm 13 in order that the bars 5 and 16 will be connected together by means of the arms.

The extension 21 of the bar 16 is shaped to form an eye 22 in which a pin or pintle 23 is lodged. A latch or guard 24 is oscillatably mounted on the pivot 23 and is intended to overlie the arm 13 and the hook 14ª thereof at its junction with the extension 21 of the bar 16 to prevent disengagement of the hook of the arm 13 from the extension 21, as is fully shown in Fig. 1. The guard 24 has an extension 25 that is shaped to interengage or interlock with the bar 16 preferably beyond the loop 18, and this interengagement of the extension 25 with the bar will prevent accidental disengagement of the interlocking parts of the chain securing device and insure the retention of the chains under normal conditions of use.

As shown, the extension has a lug 26 that fits under the bar, and the said extension has side portions 27 and 28 that prevent the extension from moving unduly laterally of the bar. The guard has its side cut away as at 29 to produce a clearance which will permit the guard to close over the hooked end 14ª of the arm 13 and when the extension of the guard is secured to the bar, the parts will appear as illustrated in Fig. 1.

Preferably the distance between the arms 12 and 13 is slightly greater than the distance between two spokes of a wheel to which the device is to be attached in order that the arm 12 will lie on one side of a spoke and the arm 13 on the opposite side of the adjacent spoke, a condition which will prevent undue circumferential movement of the chains. It is desirable, however, under certain conditions, that there be a slight movement of the device circumferentially of the tires, as such movement will prevent undue wear of the tires. However, the inventor does not wish to be limited with respect to the proportions, since it will be obvious that they may be modified within predetermined degree, without impairing the efficiency of the device as a whole.

In Figure 4 an extension A similar to the extension 21 has an eye B formed by shaping the material with the eye above the extension when in operative position rather than below the extension as where it is shown in the other figures of the drawing.

I claim:

1. In an anti-skid chain for automobiles, a bar adapted to lie in proximity to the felly of an automobile wheel at the side thereof, said bar having loops, a member extending across each loop and anchored to the bar, arms projecting from the bar and adapted to extend transversely of the felly, a bar adapted to be located opposite the first mentioned bar, means for effecting an interlocking connection between the arms of the second mentioned bar and the arms of the first mentioned bar, and chains connected to the looped portions of the bars, substantially as described.

2. In an anti-skid chain for automobiles, a bar adapted to lie in proximity to the felly of a wheel at the side thereof, said bar having loops, a member extending across each loop and anchored to the bar, arms projecting from the bar and adapted to extend transversely of the felly, a coacting bar adapted to occupy an opposite side of the felly and coact with the first mentioned bar, loops on the second mentioned bar corresponding with the loops of the first mentioned bar, means for effecting an interlocking engagement between the arms and the second mentioned bar, a guard for retaining the parts in their assembled relation, and chains connecting the loops of one bar with the loops of the other bar.

3. In an anti-skid chain for automobiles, a bar adapted to lie in proximity to the felly of a wheel at the side thereof, said bar having loops, a member extending across each loop and anchored to the bar, arms projecting from the bar and adapted to extend transversely of the felly, one of said arms terminating in an eye and the other of said arms terminating in a hook, a bar adapted to be located on the opposite side of the felly and having loops corresponding with the loops of the first mentioned bar, the second mentioned bar having an extension adapted to enter the eye of the arm and an extension at the opposite end to be engaged by the hook of the other arm, and a guard oscillatably mounted on the end of the bar engaged by the hook operative to engage the said hook and retain it in engagement with the bar, substantially as described.

JULIUS A. COLE.